United States Patent
Lee

(10) Patent No.: US 10,696,593 B2
(45) Date of Patent: Jun. 30, 2020

(54) METHOD OF QUICKLY PREPARING GEOPOLYMER HAVING HIGH STRENGTH USING COAL BOTTOM ASH

(71) Applicant: HEUNGKUK INDUSTRY CO., LTD., Hanam-si, Gyeonggi-do (KR)

(72) Inventor: Kee-Yun Lee, Seoul (KR)

(73) Assignee: HEUNGKUK INDUSTRY CO., LTD., Hanam-si (KR)

( * ) Notice: Subject to any disclaimer, the term of this patent is extended or adjusted under 35 U.S.C. 154(b) by 0 days.

(21) Appl. No.: 16/181,587

(22) Filed: Nov. 6, 2018

(65) Prior Publication Data

US 2019/0315657 A1    Oct. 17, 2019

(30) Foreign Application Priority Data

Apr. 12, 2018    (KR) .................. 10-2018-0042509

(51) Int. Cl.
C04B 28/00 (2006.01)
C04B 22/06 (2006.01)
C04B 40/00 (2006.01)
C04B 40/02 (2006.01)
C04B 103/10 (2006.01)

(52) U.S. Cl.
CPC .......... C04B 28/006 (2013.01); C04B 22/062 (2013.01); C04B 40/0032 (2013.01); C04B 40/0218 (2013.01); C04B 2103/10 (2013.01)

(58) Field of Classification Search
None
See application file for complete search history.

(56) References Cited

U.S. PATENT DOCUMENTS

| 5,601,643 A | * | 2/1997 | Silverstrim | C04B 12/04 106/606 |
| 2009/0146108 A1 | * | 6/2009 | Datta | C03C 11/002 252/378 R |
| 2013/0284070 A1 | * | 10/2013 | Dubey | C04B 11/28 106/695 |
| 2015/0251951 A1 | * | 9/2015 | Zhang | C04B 28/006 264/37.29 |
| 2017/0283319 A1 | * | 10/2017 | Maslehuddin | C04B 28/04 |

FOREIGN PATENT DOCUMENTS

| KR | 10-0891158 B | * | 4/2009 |
| KR | 10-0891158 B1 | | 4/2009 |
| KR | 10-2009-0122270 A | | 11/2009 |

(Continued)

OTHER PUBLICATIONS

Office Action corresponding to Korean Patent Application No. 10-2018-0042509; mailed by the Korean Patent Office dated May 21, 2018.

*Primary Examiner* — Matthew J Daniels
*Assistant Examiner* — Mohammad M Ameen
(74) *Attorney, Agent, or Firm* — Studebaker & Brackett PC

(57) ABSTRACT

The present invention relates to a method of preparing a geopolymer using a coal bottom ash. In the method, an alkali activating agent is used in a relatively smaller amount than in a conventional technology so that the mixture of the coal bottom ash and the alkali activating agent does not become a gel state, and a process for radiating a microwave is further provided after curing of a geopolymer specimen in an oven.

5 Claims, 15 Drawing Sheets

Mix coal bottom ash and alkali solution before reaching a gel state to prepare a mixture

↓

Fill a mold with the mixture and apply pressure to prepare a geopolymer specimen having a predetermined shape

↓

Separate the geopolymer specimen from the mold and then cure only the geopolymer specimen in an oven

↓

Heat the cured geopolymer specimen in a microwave

(56) References Cited

FOREIGN PATENT DOCUMENTS

| KR | 10-2010-0090844 A | | 8/2010 |
|----|-------------------|---|--------|
| KR | 10-2012-0053411   | * | 5/2012 |
| KR | 10-2012-0053411 A | | 5/2012 |
| KR | 10-1243094 B1     | | 3/2013 |
| KR | 10-2017-0022743   | * | 3/2017 |
| KR | 10-2017-0022743 A | | 3/2017 |

* cited by examiner

METHOD OF QUICKLY PREPARING GEOPOLYMER HAVING HIGH STRENGTH USING COAL BOTTOM ASH

BACKGROUND OF THE INVENTION

1. Field of the Invention

The present invention is a technology relating to a method of preparing a geopolymer using a coal bottom ash.

2. Description of the Related Art

Geopolymers are attracting attention as an eco-friendly material to replace cement or walls because the amount of carbon dioxide emitted during the preparation process thereof is small compared to portland cement. The addition of NaOH, KOH, $K_2SiO_3$, or $Na_2SiO_3$ as an alkali activating agent to a material containing aluminosilicate minerals such as coal fly ash or slag generates a geopolymer which has high mechanical strength and which is capable of being used as a construction material even without being subjected to a calcination process using a chemical reaction. Further, geopolymers are used instead of cement paste as a binding material in a geopolymer concrete, and a geopolymer paste serves to bind coarse aggregates, fine aggregates, and non-reactive materials, thus forming geopolymer concrete. As in concrete using portland cement, aggregate occupies the largest volume in geopolymer concrete, and the content thereof is approximately 75 to 80% in terms of mass. Si and Al in fly ash are activated by an alkali activating agent such as sodium hydroxide to thus act as binding materials. In general, compounds of sodium hydroxide (or calcium hydroxide) and/or sodium silicate (or potassium silicate) are used as the alkali activating agent, and when heat is applied thereto, a chemical reaction for generating the geopolymer accelerates. Accordingly, the geopolymer concrete is generally cured at a high temperature.

In general, geopolymers are synthesized using coal fly ash, which is generated with relatively high yield and has a small particle size. On the other hand, bottom ash, which has a relatively large particle size ranging from a few millimeters to a few centimeters and an irregular shape, is not utilized but is being disposed of using landfill, unlike fly ash. However, since bottom ash is very similar to fly ash in terms of constitutional components, bottom ash may be used as a raw material for geopolymers, like the fly ash, if the particle size thereof is lowered by grinding. When the bottom ash is reused so that the geopolymer is synthesized to thus replace cement, waste may be reused and the amount of carbon dioxide generated by the cement industry may be greatly reduced, thus ensuring a very economical and eco-friendly method.

Conventional prior art patents relating to geopolymers using bottom ash are as follows.

Korean Laid-Open Patent Application No. 10-2009-0122270 discloses a method of preparing eco-friendly eco-bricks using a geopolymer reaction of the bottom ash (coal bottom ash) from the boiler of a thermoelectric power plant. The method includes adding to 40 wt % of a 6 to 12 mole/L aqueous solution of sodium hydroxide, which is an alkali stimulant, to the bottom ash, followed by mixing; and placing the mixture into a molding frame, followed by compression molding and curing.

Korean Laid-Open Patent Application No. 10-2010-0090844 discloses a method of preparing a molded body using urban waste incineration ash. In the method, a slurry-phase mixture, in which 50 to 100 parts by weight of sodium silicate is added to 100 parts by weight of the dry mortar powder that includes 10 to 70 wt % of the urban waste incineration ash, including 10 to 30 wt % of an incineration fly ash and 70 to 90 wt % of an incineration bottom ash pre-treated using an alkali solution, and 30 to 90 wt % of blast furnace slag, is subjected to vibration molding and then cured at a temperature ranging from 25 to 80° C.

Korean Patent No. 10-1243094 discloses a method of recovering a refined ash material. The method includes: a grinding step of grinding a raw material including a bottom ash, a fly ash, or a mixture thereof in a power plant, a flotation-sorting step of adding a flotation reagent to the raw material and recovering carbon clean coal by floatation so that the carbon clean coal and the ash material are separated, a re-grinding step of re-grinding a first ash material, which is the ash material separated during the flotation-sorting step, so that liberation into the ash material, a ferromagnetic body, and a ferrimagnetic body is performed, a primary magnetic-sorting step of sorting the ferromagnetic body liberated from the re-ground first ash material using a magnetic sorting device to thus separate the ferromagnetic body and the ash material, and a secondary magnetic-sorting step of sorting the ferrimagnetic body obtained by performing liberation of a secondary ash material obtained after the ferromagnetic body is sorted during the primary magnetic-sorting step using the magnetic sorting device, thereby separating the ferrimagnetic body and the ash material.

However, the conventional methods of preparing geopolymers using bottom ash, including those described in the patent documents cited above, have the following problems. First, when a specimen is prepared by mixing raw materials to form a gel state, the impurities separated from the bottom ash form a separate layer at the upper part of the specimen, thus reducing the compressive strength thereof. Second, it takes a long time (for example, 28 days) to achieve sufficiently high compressive strength to use the prepared specimen industrially.

The present invention is a technology which has been made keeping in mind the above problems occurring in the conventional preparation of the geopolymer using the coal bottom ash.

PRIOR ART DOCUMENT

Patent Document (Patent document 1) Korean Laid-Open Patent Application No. 10-2009-0122270
(Patent document 2) Korean Laid-Open Patent Application No. 10-2010-0090844
(Patent document 3) Korean Patent No. 10-1243094

SUMMARY OF THE INVENTION

It is an object of the present invention to provide a novel method of preparing a geopolymer using a coal bottom ash.

In particular, the object of the present invention is to provide a method of preparing a geopolymer having low thermal conductivity while exhibiting high compressive strength in a short curing time when the geopolymer is prepared using a coal bottom ash.

In particular, a conventional technology has a problem in that a large number of expensive molds is required because curing is performed in an oven in the state in which a geopolymer is contained in the mold. However, the object of the present invention is to provide a method for solving the above-described problem.

The present invention provides a method of preparing a geopolymer using a coal bottom ash. The method includes a step (1) of preparing a mixture of the coal bottom ash and an alkali activating agent by performing mixing while the amount of the alkali activating agent is adjusted so that the mixture does not become a gel, a step (2) of filling a mold with the mixture of the coal bottom ash and the alkali activating agent and applying a pressure thereto to thus prepare a geopolymer specimen, a step (3) of curing only the geopolymer specimen in an oven for a predetermined period of time after the geopolymer specimen is separated from the mold, and a step (4) of radiating microwaves on the geopolymer specimen after the curing.

In particular, the content of the alkali activating agent may be 0.36 to 0.40 based on 1 part by weight of the coal bottom ash in the step (1).

In particular, the content of the alkali activating agent may be increased as high as possible while the mixture is not gelled in the step (1) in order to increase the compressive strength of the geopolymer.

In particular, the alkali activating agent may be any one selected from the group consisting of NaOH, KOH, $K_2SiO_3$, and $Na_2SiO_3$ in the step (1).

In particular, the temperature of the oven may be 50 to 85° C. in the step (3).

In particular, the geopolymer specimen may be cured in the oven in a sealed state in order to prevent rapid water evaporation from the geopolymer specimen in the step (3).

In particular, the relative ratio of the bottom ash and the alkali activating agent may be adjusted to thus control the compressive strength and the thermal conductivity of the geopolymer in the step (1).

In particular, the pressure may be adjusted during compression molding in the mold to thus control the compressive strength and the thermal conductivity of the geopolymer in the step (2).

In particular, an oven curing time may be adjusted to thus control the compressive strength and the thermal conductivity of the geopolymer in the step (3).

In particular, an output or a radiation time of the microwave may be adjusted to thus control the compressive strength and the thermal conductivity of the geopolymer in the step (4).

In the present invention, a mixture (or solution) of a coal bottom ash and an alkali activating agent is injected into a mold while the mixture is not in a gel state by reducing the amount of the alkali activating agent that is mixed with the coal bottom ash. Therefore, there is a merit in that only a geopolymer specimen is put into an oven and then cured therein after the geopolymer specimen is demolded from the mold, unlike the conventional technology, thereby significantly reducing the number of molds.

Further, in the present invention, since the mold is not used during the curing process in the oven, heat and mass transfer to the inside of the specimen is not impeded by the mold, which enables more uniform curing.

Further, the present invention has an effect whereby further curing and hardening of the specimen cured in the oven are performed in a very short time by radiating a microwave. It is possible to obtain the target compressive strength of the geopolymer in a short time by radiating the microwaves as in the present invention, compared to a conventional method without microwave radiation.

Further, in the present invention, since only a small amount of the alkali activating agent is used, so that the mixture of the coal bottom ash and the alkali activating agent is not gelled, it is possible to radiate high-output microwaves due to a low water content. Accordingly, it is possible to prepare a geopolymer having desired physical properties of the present invention using microwave radiation in a short time of several minutes.

Further, in the present invention, since the mixture does not become a gel state, when the mixture (bottom ash+alkali activating agent) is contained in the mold, the mixture is contained therein while pressure is applied thereto, and the pressure may be adjusted during this process, thereby controlling the physical properties of the specimen. For example, when a high pressure is applied to a mold filled with the mixture of the coal bottom ash and the alkali activating agent, the thermal conductivity is slightly high, but very high mechanical strength is capable of being achieved. When a relatively low pressure is applied thereto, although the strength is reduced, an insulation effect is capable of being improved by lowering the thermal conductivity. That is, in the present invention, it is possible to control the thermal conductivity and the mechanical strength of the finally prepared geopolymer by adjusting the pressure of a process for molding the mixture of the coal bottom ash and the alkali activating agent in the mold.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a geopolymer in an intermediate process before final preparation in the present invention will be referred to as a "geopolymer specimen" for convenience. Further, in the present invention, "bottom ash" is used as an abbreviation for "coal bottom ash".

Figure 1:
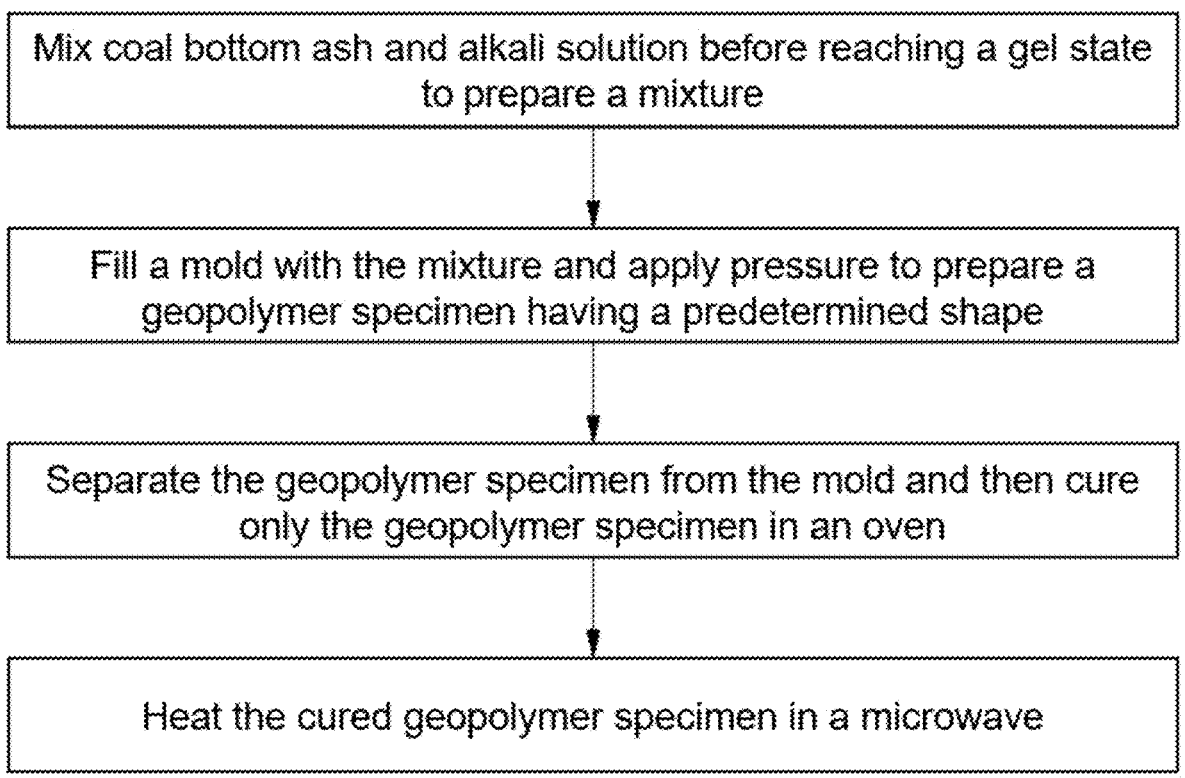
FIG. 1 is a flow chart illustrating a method of the present invention.

FIG. 1 illustrates the method of the present invention. The present invention provides a method of preparing a geopolymer using a coal bottom ash. The method includes a step (1) of performing mixing while the amount of the alkali activating agent is adjusted so that the bottom ash does not become a gel, a step (2) of filling a mold with the mixture of the bottom ash and the alkali activating agent and applying pressure thereto to thus prepare a geopolymer specimen, a step (3) of curing only the geopolymer specimen in an oven for a predetermined period of time after the geopolymer specimen is separated from the mold, and a step (4) of irradiating the geopolymer specimen in a microwave for a predetermined period of time after the curing.

Hereinafter, each step will be described in more detail.

Step (1)

In order to solve the problem of a reduction in compressive strength of the prepared geopolymer due to the layer separation of impurities when the curing is performed through mixing with the alkali activating agent (for example, NaOH, KOH, $K_2SiO_3$, and $Na_2SiO_3$) until the bottom ash becomes a gel state in the conventional technology, the alkali activating agent is used in an amount that is less in the present invention than in the conventional technology. In the present invention, the bottom ash is mixed with the alkali activating agent while the amount of the alkali activating agent is adjusted so that the mixture does not become a "gel" state. The present invention is not intended to mix as much as possible of the alkali activating agent before reaching the "gel" state, but means that the content of the alkali activating agent is variously adjustable while the mixture is not in the "gel" state.

In the present invention, since the mixture of the bottom ash and the alkali activating agent does not become a gel state, the geopolymer specimen may be demolded from the mold, so that only the geopolymer specimen may be cured in the oven without the mold. In this way, the number of molds required for preparing a large amount of the geopolymer is significantly reduced, and moreover, transfer of heat and mass to the inside of the geopolymer specimen during the oven curing process is not impeded by the mold. Accordingly, there is a merit in that more uniform curing is feasible. It is possible to embody the strength of the geopolymer more rapidly through the method of the present invention than through the method of curing in the oven with the geopolymer specimen placed in the mold.

Step (2)

The mold is filled with the mixture of the bottom ash and the alkali activating agent and compression is performed to thus prepare a geopolymer specimen having a predetermined shape, for example, a brick shape. A predetermined time may be elapsed after the compression, but the geopolymer specimen is usually pulled from the mold immediately after the compression. The physical properties of the finally prepared geopolymer may be adjusted depending on the pressure applied thereto. For example, when high pressure is applied, the thermal conductivity is slightly high, but very high mechanical strength may be achieved. When relatively low pressure is applied, although the strength is reduced, an insulation effect is capable of being improved by lowering the thermal conductivity. That is, in the present invention, it is possible to adjust the physical properties of the finally prepared geopolymer by adjusting the pressure in the molding process.

Step (3)

In step (3), after the geopolymer specimen was separated from the mold, only the geopolymer specimen was cured in the oven for a predetermined period of time. In Experimental Example 1, as will be described later, experiments were performed at 75° C. for 12 hours, 24 hours, and 36 hours. The oven curing time is variable depending on various factors such as the raw material of the coal bottom ash and the type and concentration of the alkali activating agent, and usually several hours or more to several days or tens of days or more is possible. Accordingly, the scope of the oven curing time is not limited in the present invention. The temperature of the oven is capable of being varied and, for example, may be 50 to 85° C. Further, the oven curing time may be adjusted to thus control the physical properties of the finally prepared geopolymer, for example, the thermal conductivity and compressive strength thereof.

Step (4)

In the present invention, microwaves were further used during the process of curing the geopolymer specimen. Radiation of the microwaves on the specimen subjected to the curing in the oven for a predetermined period of time results in achievement of curing and hardening in a very short time. Accordingly, high strength may be achieved quickly compared to specimens cured at room temperature over a long period of time. Heating using the microwave is even more efficient in terms of energy consumption and is more effective because the inside of the geopolymer specimen is capable of being uniformly heated compared to the case of using an oven. In the present invention, since a small amount of the alkali activating agent is used, the amount of water contained in the geopolymer specimen is relatively small, so that high-output microwaves may be used. Using such high-output microwaves may result in achievement of drying and hardening of the geopolymer specimen in a very short time of a few minutes.

The microwave radiation time is capable of being varied depending on various factors such as the output of the microwave, the raw material of the coal bottom ash, the type and concentration of the alkali activating agent, and the physical properties of the geopolymer product. In the following Experimental Examples of the present invention, respective experiments were performed in several minutes.

EXPERIMENTAL EXAMPLES

Hereinafter, the present invention will be described in more detail with reference to Experimental Examples. Hereinafter, an initial bulk density will refer to the bulk density of a geopolymer specimen demolded from a mold, and a final bulk density was used as a term meaning the bulk density of the finally prepared geopolymer.

Experimental Example 1: Physical Property Experiment According to Oven Curing Time and Microwave Radiation Time In Example 1, the influence of curing time and a microwave radiation time using an oven at 75° C. on the physical properties of a geopolymer was examined.

In Experimental Example 1, coal bottom ash obtained from Korea South-East Power Co., Ltd. was used as a raw material. The coal bottom ash was ground three times using a hammer mill, the bottom ash that was ground was filtered using a standard No. 200 (75 μm) sieve, and the geopolymer was synthesized using only the small particles that passed therethrough. An aqueous solution of sodium hydroxide (NaOH) was used as an alkali activating agent for chemically activating the bottom ash. Solid sodium hydroxide with a purity of 93 wt % was dissolved in tap water to thus prepare an aqueous solution, and the concentration thereof was adjusted to 14 M to attain the highest strength, based on the result of a preliminary experiment. Further, the prepared alkali activating agent was mixed with the bottom ash at a ratio of 0.38 based on the mass of the bottom ash, which was a value obtained as the result of a preliminary experiment showing the highest compressive strength while the mixture was not in a gel state. However, the above-described ratio is varied depending on variables such as the type of the coal bottom ash and the type and concentration of the alkali aqueous solution, and therefore, it is specified that the above-described ratio is not an absolute optimum ratio for all materials.

The synthesis of the geopolymer specimen and the measurement of the physical properties thereof were performed according to the following process. First, the bottom ash and the alkali solution were mixed using a Hobart mixer for 5 minutes. The mixture was placed in a plastic mold having a size of 5×5×5 $cm^3$ and was compressed using a hand press.

Immediately after the compression, the geopolymer specimen was separated from the mold, placed on a stainless steel tray, and cured in an oven at 75° C. During the curing process in the oven, a plastic bag was used to seal the specimen and the tray in order to prevent rapid evaporation of water immediately after being placed in the oven due to heat before the reaction sufficiently proceeded.

The geopolymer specimen cured in the oven for a predetermined period of time was sufficiently cooled at room temperature, and microwave radiation was then performed using a household microwave having an output of 700 W. After the geopolymer on which the microwave was radiated was sufficiently cooled at room temperature, the thermal conductivity (TPS500S, Hot Disk, Sweden) and the compressive strength (PL-9700H, Woojin Precision Co., Korea) were measured. After the compressive strength was measured, a portion of the crushed specimen was sufficiently ground to measure a true density (powder density) using true-density measurement equipment (gas pycnometer, AccuPyc II 1340, Micromeritics, U.S.A.). The porosity of the geopolymer was calculated according to the following Equation using the bulk density obtained by dividing the measured true density and a mass by a volume.

$$\text{Porosity } (\%) = \left(1 - \frac{\text{Bulk density}}{\text{Powder density}}\right) \times 100.$$

The compressive strength and the bulk density were obtained using the averages of the result values of three geopolymer samples, and the thermal conductivity and the true density were measured six times and five times, respectively, and the average values thereof were used.

In Experimental Example 1, the experiment was performed while the oven curing time and the microwave radiation time were changed. The experiment was performed for three cases corresponding to oven curing times of 12, 24, and 36 hours. A microwave was radiated for eight different radiation times of 0 to 7 minutes with an increment of one minute on the geopolymer specimens cured in the oven for 12 hours, and was radiated on other geopolymer specimens for six different radiation times of 0 to 5 minutes with an increment of one minute. Further, the initial bulk density of the geopolymer specimen after the geopolymer specimen was demolded from the mold was set to two cases (1.98 $g/cm^3$ and 1.82 $g/cm^3$) (the initial bulk density was large when the pressure applied to the mold was high), and the influence thereof on the physical properties of the finally prepared geopolymer depending on the pressure applied to the mold was examined.

Experimental Example 1-1: Measurement of Physical Properties of Raw Materials

The physical properties of the geopolymers depend very heavily on the physical and chemical properties of the raw materials. As shown in Table 1 below, the sum of the component ratios of $SiO_2$, $Al_2O_3$, and $Fe_2O_3$ exceeded 70% with respect to the chemical component ratio of the bottom ash, analyzed using X-ray fluorescence analysis.

TABLE 1

| Species | $SiO_2$ | $Al_2O_3$ | $Fe_2O_3$ | CaO | $Na_2O$ | $K_2O$ | MgO | $TiO_2$ | LoI | Others |
|---|---|---|---|---|---|---|---|---|---|---|
| Composition (wt. %) | 51.4 | 20.6 | 11.2 | 7.76 | 1.84 | 1.78 | 1.58 | 1.34 | 0.788 | 1.712 |

Figure 2:
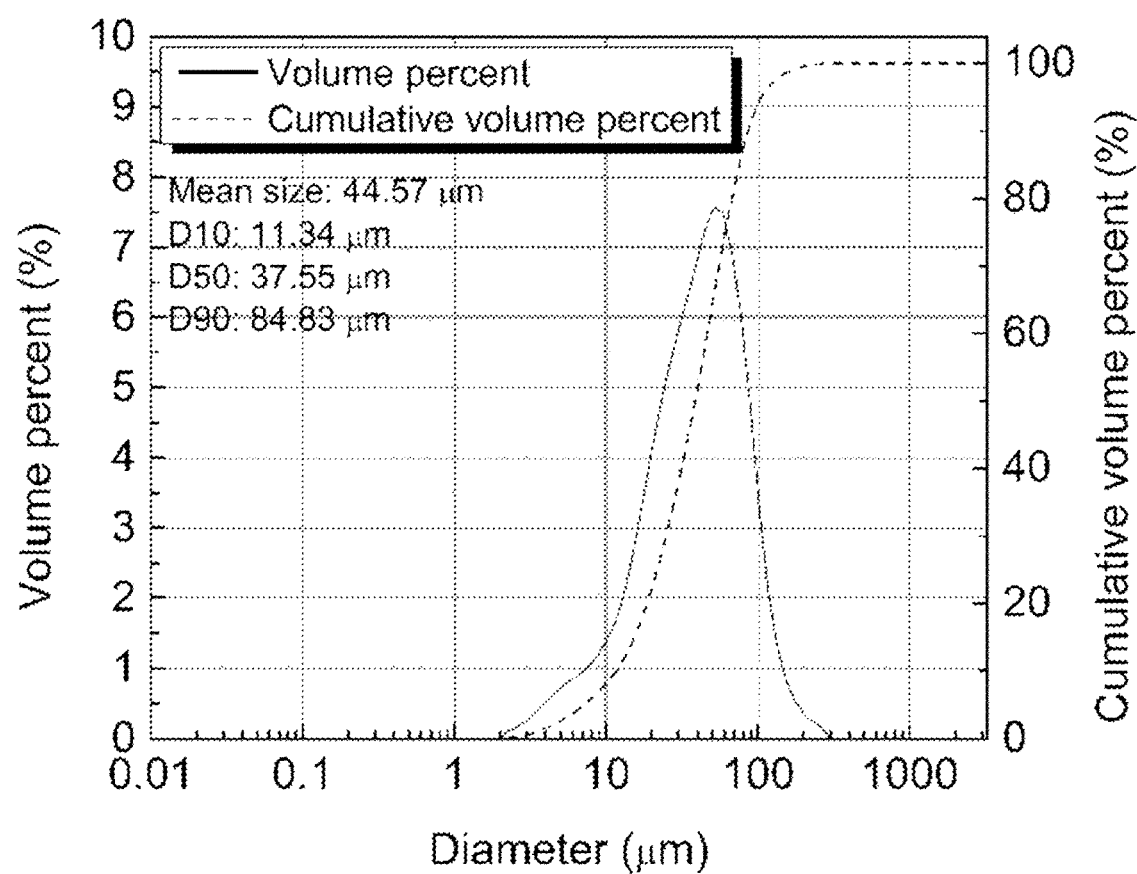
FIG. 2 is a particle size distribution diagram of the coal bottom ash used in Experimental Example 1.

The particle size distribution of the bottom ash is shown in FIG. 2. The average particle size thereof was 44.57 μm, and 90% or more of the particles had a particle size of 84.83 μm or less.

Experimental Example 1-2: Measurement Experiment of Bulk Density/True Density/Porosity The oven curing time, microwave radiation time, initial bulk density condition, final bulk density and true density result, and porosity values of each geopolymer specimen are shown in Table 2 below. For the name of the specimen, 12 H, 24 H, and 36 H indicate the oven curing time (hour), and 0 to 7 M indicate the microwave radiation time (minute). Further, L means a specimen having a low initial density (1.82 g/cm³) (geopolymer demolded from the mold) in the preparation of the geopolymer. In the case of the geopolymer specimens having the same oven curing time condition, as the microwave radiation time was increased, the bulk density of the finally prepared geopolymer was reduced and the true density was increased. As a result, the porosity of the geopolymer was increased. Further, in the case where the curing time in the oven was increased, the final bulk density was low even for the same microwave radiation times, causing an increase in porosity. In the case of the geopolymer specimens having the low initial bulk density, the bulk density of the finally prepared geopolymer was low, and the change patterns in density and porosity depending on the oven and microwave radiation times were the same.

TABLE 2

| Sample name | Oven curing time (hour) | Microwave radiation time (minute) | Initial bulk density (g/cm³) | Final bulk density (g/cm³) | Powder density (g/cm³) | Porosity (%) |
|---|---|---|---|---|---|---|
| 12H0M | 12 | 0 | 1.98 | 1.94 | 2.37 | 18.2 |
| 12H1M |    | 1 |      | 1.92 | 2.37 | 19.3 |
| 12H2M |    | 2 |      | 1.86 | 2.39 | 22.2 |
| 12H3M |    | 3 |      | 1.80 | 2.52 | 28.5 |
| 12H4M |    | 4 |      | 1.74 | 2.55 | 31.8 |
| 12H5M |    | 5 |      | 1.67 | 2.64 | 36.8 |
| 12H6M |    | 6 |      | 1.65 | 2.65 | 37.8 |
| 12H7M |    | 7 |      | 1.65 | 2.66 | 38.2 |
| 24H0M | 24 | 0 | 1.98 | 1.88 | 2.43 | 22.4 |
| 24H1M |    | 1 |      | 1.88 | 2.42 | 22.5 |
| 24H2M |    | 2 |      | 1.82 | 2.48 | 26.5 |
| 24H3M |    | 3 |      | 1.76 | 2.55 | 31.3 |
| 24H4M |    | 4 |      | 1.72 | 2.55 | 32.6 |
| 24H5M |    | 5 |      | 1.68 | 2.62 | 36.0 |
| 36H0M | 36 | 0 | 1.98 | 1.88 | 2.44 | 22.8 |
| 36H1M |    | 1 |      | 1.81 | 2.51 | 27.9 |
| 36H2M |    | 2 |      | 1.77 | 2.53 | 30.1 |
| 36H3M |    | 3 |      | 1.72 | 2.58 | 33.4 |
| 36H4M |    | 4 |      | 1.69 | 2.62 | 35.6 |
| 36H5M |    | 5 |      | 1.66 | 2.62 | 36.8 |
| L12H0M | 12 | 0 | 1.82 | 1.78 | 2.46 | 27.6 |
| L12H1M |    | 1 |      | 1.76 | 2.38 | 26.2 |
| L12H2M |    | 2 |      | 1.72 | 2.40 | 28.6 |
| L12H3M |    | 3 |      | 1.65 | 2.51 | 34.5 |
| L12H4M |    | 4 |      | 1.55 | 2.60 | 40.5 |
| L12H5M |    | 5 |      | 1.54 | 2.60 | 40.5 |
| L12H6M |    | 6 |      | 1.53 | 2.64 | 42.2 |
| L12H7M |    | 7 |      | 1.52 | 2.65 | 42.8 |
| L24H0M | 24 | 0 | 1.82 | 1.72 | 2.44 | 29.6 |
| L24H1M |    | 1 |      | 1.68 | 2.47 | 32.1 |
| L24H2M |    | 2 |      | 1.65 | 2.52 | 34.5 |
| L24H3M |    | 3 |      | 1.58 | 2.57 | 38.6 |
| L24H4M |    | 4 |      | 1.55 | 2.58 | 40.1 |
| L24H5M |    | 5 |      | 1.53 | 2.65 | 42.5 |
| L36H0M | 36 | 0 | 1.82 | 1.68 | 2.49 | 32.7 |
| L36H1M |    | 1 |      | 1.65 | 2.50 | 33.8 |
| L36H2M |    | 2 |      | 1.63 | 2.53 | 35.5 |
| L36H3M |    | 3 |      | 1.57 | 2.41 | 39.7 |
| L36H4M |    | 4 |      | 1.54 | 2.61 | 41.0 |
| L36H5M |    | 5 |      | 1.53 | 2.64 | 42.2 |

Experimental Example 1-3: Compressive Strength

Figure 3:
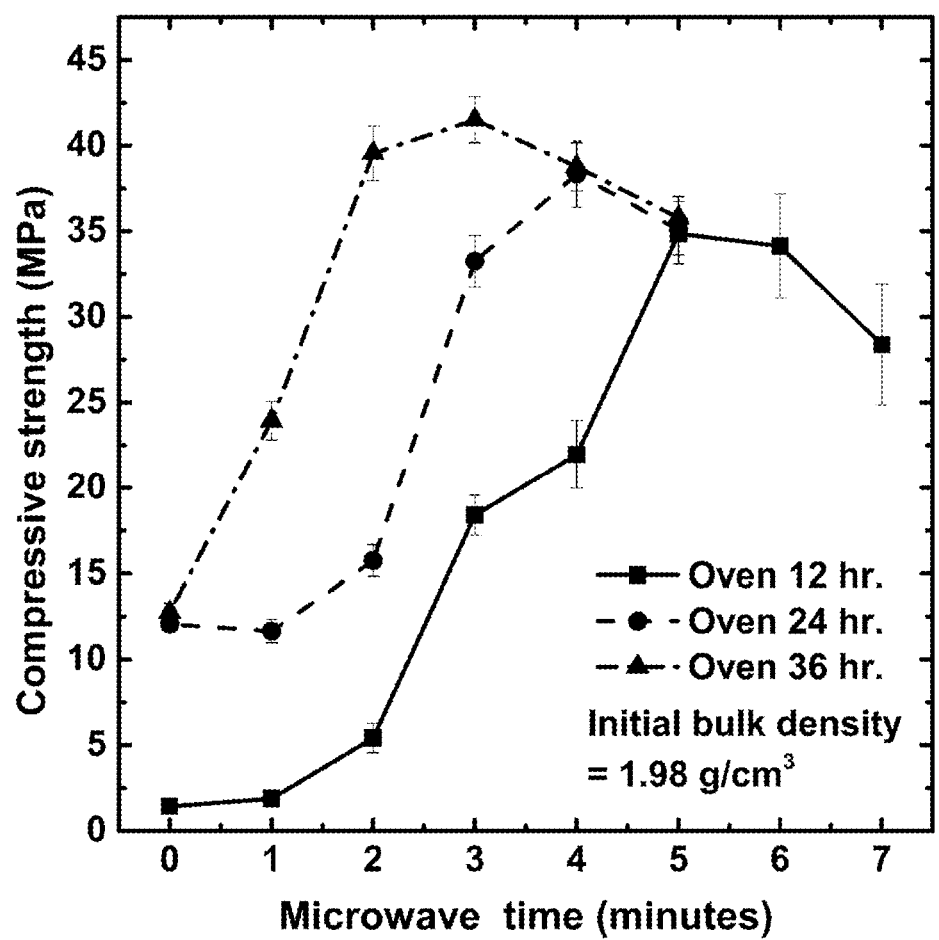
FIG. 3 shows the result of Experimental Example 1-3 and is a graph showing the result of an experiment to measure microwave radiation time vs. compressive strength of a geopolymer, which is prepared using a geopolymer specimen (bulk density=1.98 $g/cm^3$) demolded from a mold.
Figure 4:
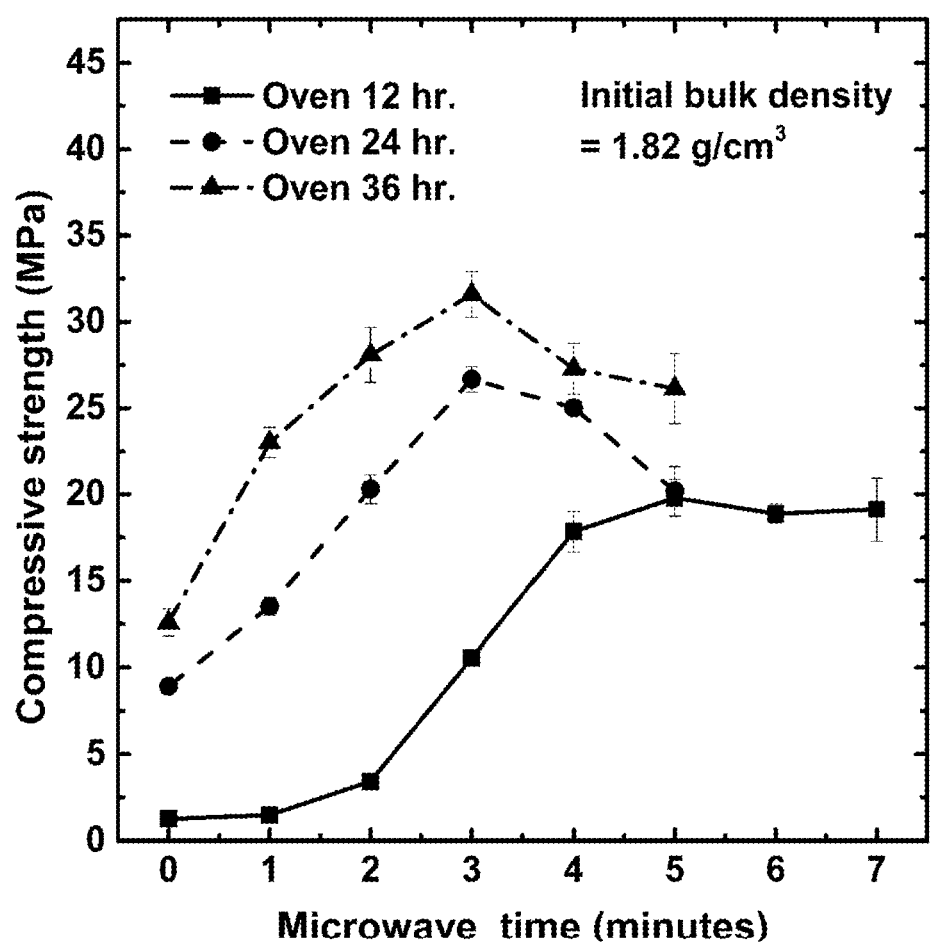
FIG. 4 shows the result of Experimental Example 1-3 and is a graph showing the result of an experiment to measure microwave radiation time vs. compressive strength of a geopolymer, which is prepared using a geopolymer specimen (bulk density=1.82 $g/cm^3$) demolded from a mold.

The results of the compressive strengths of the geopolymer specimens having different initial bulk densities, depending on the oven curing time and the microwave radiation time, are shown in FIGS. 3 and 4. In both cases where the initial bulk densities were different from each other, the change patterns in strength depending on the oven curing time and the microwave radiation time were the same.

For the same microwave radiation time, the longer the curing time in the oven, the higher the compressive strength of the geopolymer. The reason for this is that when the curing time in the oven is increased, the reaction more readily occurs, thus more readily forming the geopolymer. When the radiation time of the microwaves was increased for the same oven curing time, the compressive strength of the geopolymer tended to increase and then decrease. When the microwaves were radiated, the drying of the geopolymer occurred rapidly, so that the geopolymer was hardened to thus increase the compressive strength thereof. However, when the microwaves were radiated for longer than a certain amount of time, the temperature of the geopolymer was excessively increased, which excessively evaporated water from inside the geopolymer and deformed the structure of the rigid geopolymer. For the same reason, the deviation of the compressive strengths between the geopolymers was increased when the microwave radiation time was long.

Further, as the oven curing time was increased, the microwave radiation time at which the compressive strength of the geopolymer was highest tended to be shortened. When the initial bulk density was low, the change patterns in strength were the same, but the compressive strength of the geopolymer was generally low. However, it is notable that, when the microwaves were radiated for a short time on the specimen cured in the oven for 24 hours or 36 hours, the compressive strength was higher in the geopolymer prepared using the geopolymer specimen having low initial bulk density than in the geopolymer prepared using the geopolymer specimen having high bulk density. When the initial bulk density was 1.98 g/cm$^3$, the highest compressive strength was 34.9, 38.3, and 41.5 MPa for oven curing times of 12, 24, and 36 hours and microwave radiation times of 5, 4, and 3 minutes, respectively. When the initial density was 1.82 g/cm$^3$, the highest compressive strength was 19.8, 26.7 and 31.6 MPa for the same oven time when the microwaves were radiated for 5, 3 and 3 minutes, respectively.

Experimental Example 1-4: Thermal Conductivity and Porosity

Figure 5:
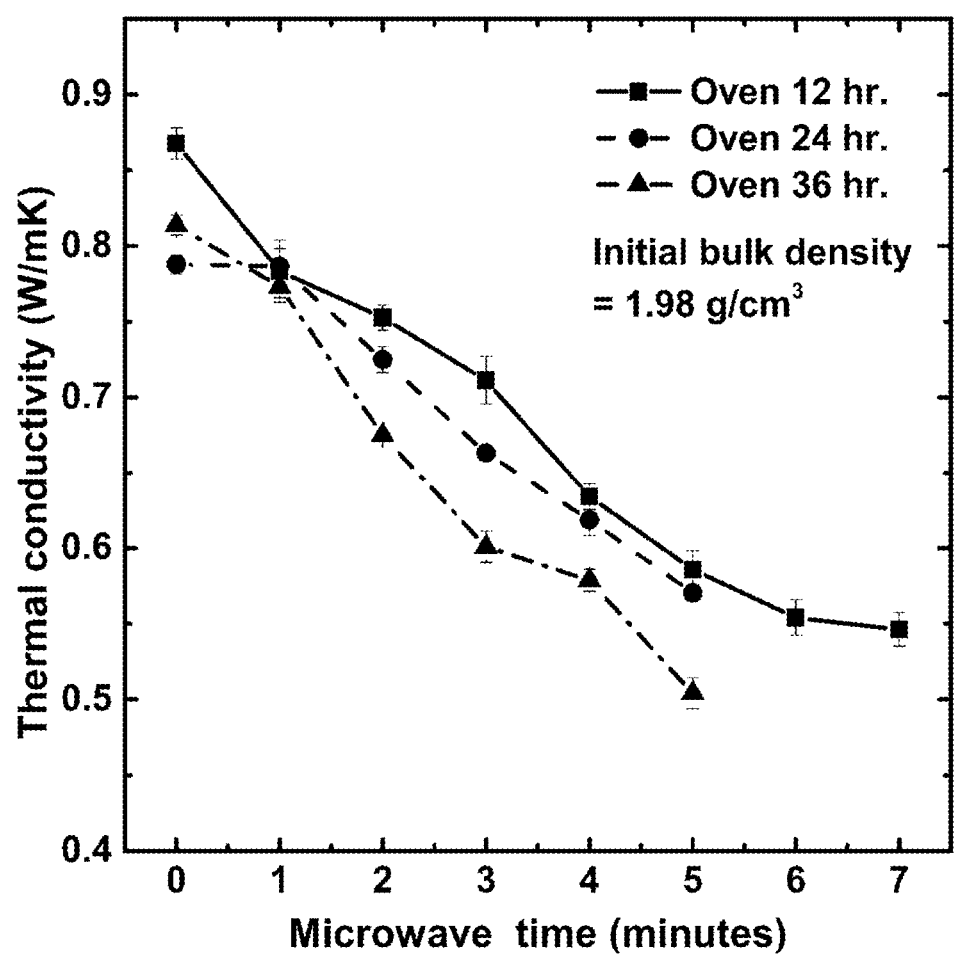
FIG. 5 shows the result of Experimental Example 1-4 and is a graph showing the result of an experiment to measure microwave radiation time vs. thermal conductivity of a geopolymer, which is prepared using a geopolymer specimen (bulk density=1.98 $g/cm^3$) demolded from a mold.
Figure 7:
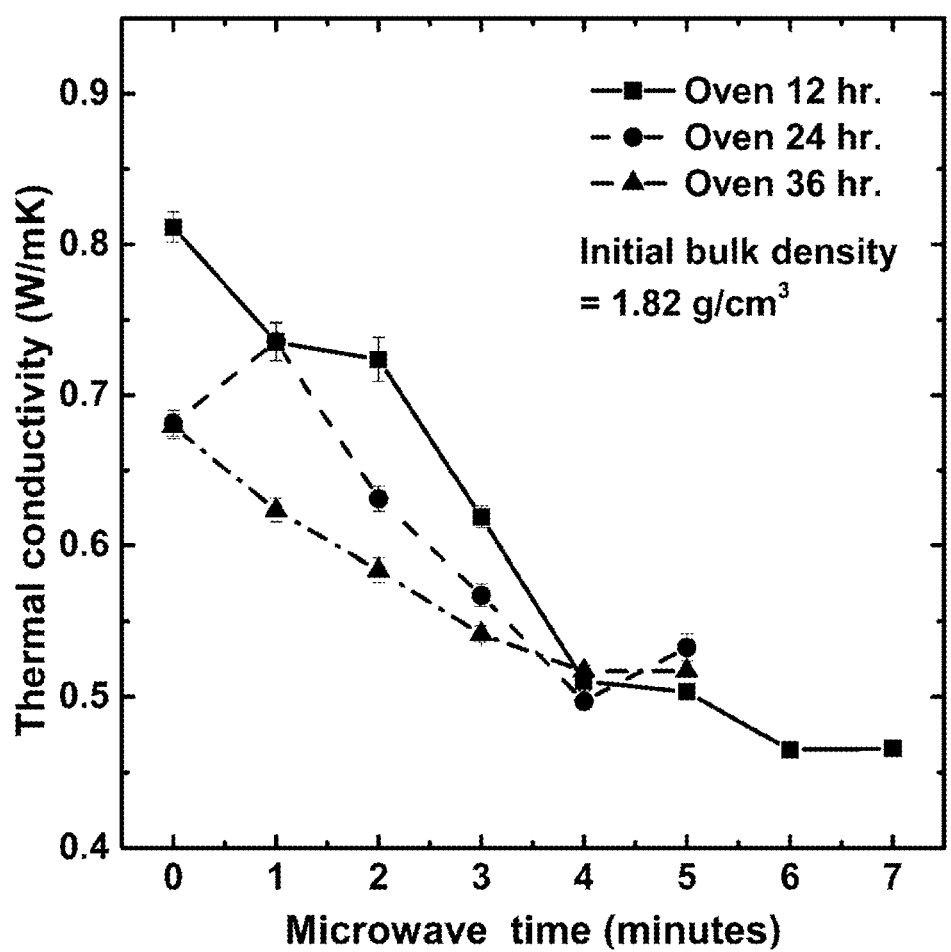
FIG. 7 shows the result of Experimental Example 1-4 and is a graph showing the result of an experiment to measure microwave radiation time vs. thermal conductivity of a geopolymer, which is prepared using a geopolymer specimen (bulk density=1.82 $g/cm^3$) demolded from a mold.

The thermal conductivity of the geopolymer depending on each curing condition is shown in FIGS. 5 and 7. Regardless of the initial bulk density of the geopolymer specimen, the thermal conductivity of the final geopolymer tended to be reduced as the oven curing and microwave radiation times were increased. As seen earlier, as the oven curing and microwave radiation times are increased, the final bulk density of the geopolymer is reduced and the true density is increased, resulting in an increase in the porosity of the geopolymer.

Figure 6:
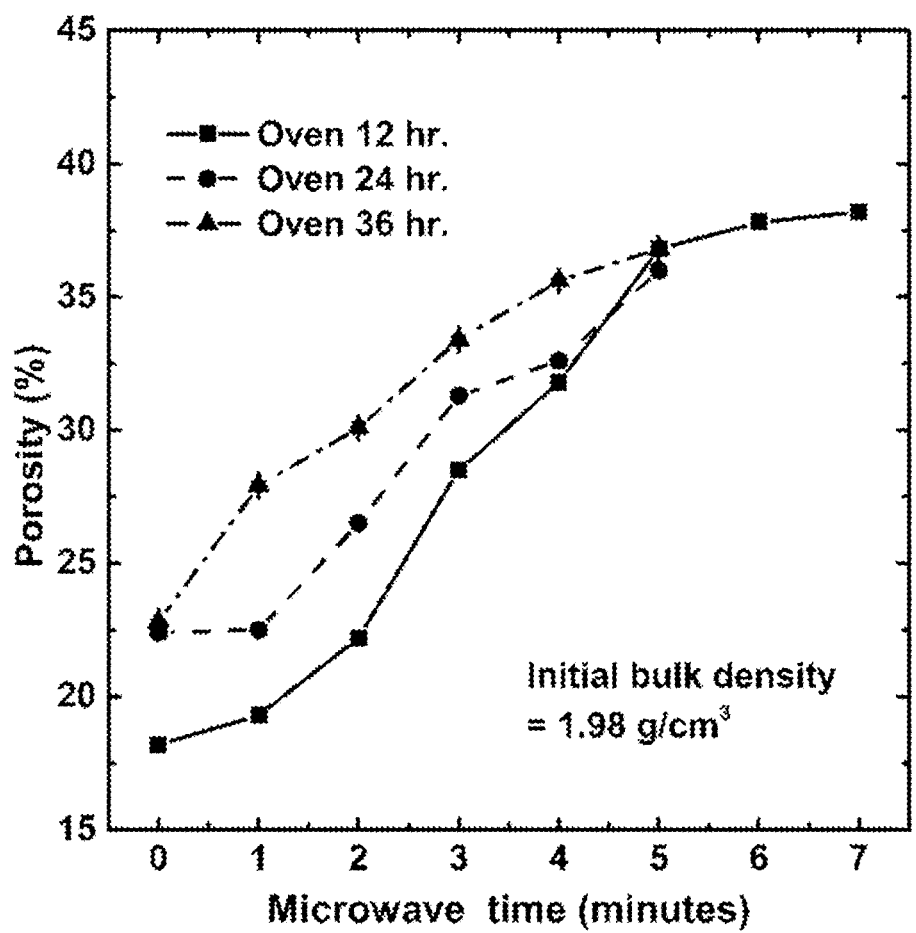
FIG. 6 shows the result of Experimental Example 1-4 and is a graph showing the result of an experiment to measure microwave radiation time vs. porosity of a geopolymer, which is prepared using a geopolymer specimen (bulk density=1.98 $g/cm^3$) demolded from a mold.
Figure 8:
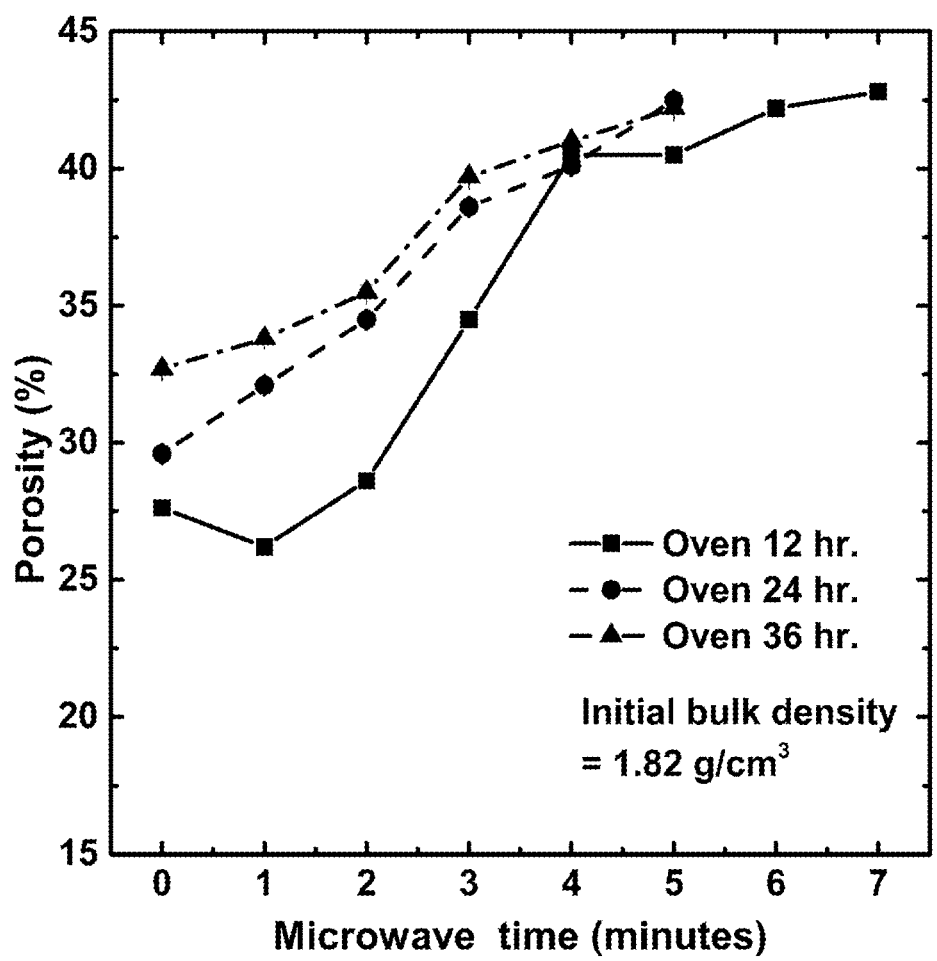
FIG. 8 shows the result of Experimental Example 1-4 and is a graph showing the result of an experiment to measure microwave radiation time vs. porosity of a geopolymer, which is prepared using a geopolymer specimen (bulk density=1.82 $g/cm^3$) demolded from a mold.

FIGS. 6 and 8 show the result of the porosity experiment, and the thermal conductivity of the geopolymer has a very close relationship with the porosity. Accordingly, the thermal conductivity is reduced as the porosity is increased. Thus, when the oven curing and microwave radiation times were increased, the porosity of the geopolymer was increased and the thermal conductivity thereof was reduced. Even when the initial bulk density was low, the change patterns in the thermal conductivity of the final geopolymer were the same, but under the same conditions, the thermal conductivity was lower than that of the geopolymer prepared using the geopolymer specimen having high bulk density. This is because the porosity of the geopolymer having low initial bulk density is relatively larger.

The results of Experimental Example 1 are summarized as follows. It could be confirmed that as the oven curing and microwave radiation times were increased, the bulk density of the geopolymer was reduced and the true density thereof was increased, resulting in an increase in the porosity of the geopolymer. Further, as the oven curing time was increased for the same microwave radiation time, the geopolymer showed a higher compressive strength. As the microwave radiation time was increased for the same oven curing time, the strength of the geopolymer was increased and then reduced. Further, as the oven curing time was increased, the microwave radiation time at which the geopolymer had the highest compressive strength was shortened. In the case where the initial bulk density was 1.98 g/cm$^3$, the highest compressive strength of the geopolymer was 41.5 MPa when the geopolymer was cured in the oven for 36 hours and the microwave was radiated thereon for 3 minutes. In the case where the initial bulk density was 1.82 g/cm$^3$, the compressive strength of the geopolymer was 31.6 MPa under the same conditions. Further, as the microwave radiation time was increased for the same oven curing time, the thermal conductivity of the geopolymer was reduced. The thermal conductivity of the geopolymer using the specimen having low initial bulk density was lower. The change pattern in thermal conductivity depending on the curing conditions was very closely related to porosity, and therefore, the thermal conductivity was lowered as the porosity of the geopolymer was increased. The thermal conductivity of the geopolymer, which exhibited the highest strength and which was cured in the oven for 36 hours, followed by microwave radiation thereon for 3 minutes, was 0.60 W/mK and 0.53 W/mK for both cases when the initial bulk density was high and low, respectively.

Experimental Example 2: Experiment According to Mixing Ratio of Bottom Ash and Alkali Activating Agent In Experimental Example 2, the change in physical properties depending on a liquid (=alkali activating agent)/solid (=coal bottom ash) ratio was assayed. In Experimental Example 2, a geopolymer was synthesized while increasing the liquid/solid ratio from 0.36 to 0.43 in increments of 0.01. Curing conditions were fixed so that the curing was performed in an oven at 75° C. for 24 hours and using 700 W microwaves for 3 minutes. The remaining experimental conditions were the same as those of Experimental Example 1.

The bottom ashes used in Experimental Example 2 and Experimental Example 3 as will be described later exhibited the component ratios shown in Table 3 below, and the average particle diameter thereof was 38.82 μm. 90% or more of the particles had a particle diameter of 78.01 μm or less.

TABLE 3

| Species | SiO$_2$ | Al$_2$O$_3$ | Fe$_2$O$_3$ | CaO | K$_2$O | TiO$_2$ | MgO | Na$_2$O | LoI | Others |
|---|---|---|---|---|---|---|---|---|---|---|
| Composition (wt. %) | 58.6 | 17.3 | 14.8 | 4.21 | 1.29 | 1.19 | 0.866 | 0.746 | — | 0.998 |

Experimental Example 2-1: Compressive Strength Experiment

Figure 9:
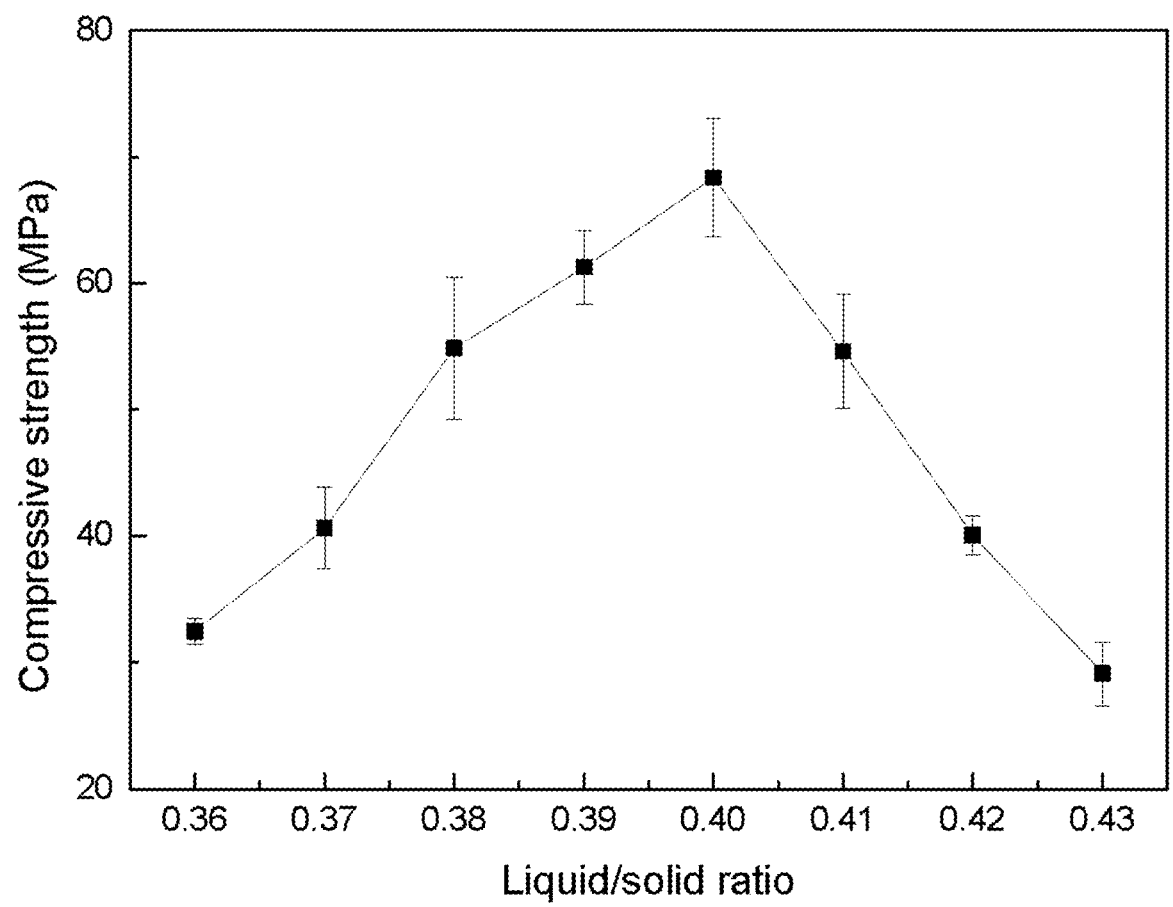
FIG. 9 shows the result of Experimental Example 2-1 and is a graph showing the result of measurement of liquid/solid ratio vs. compressive strength.
Figure 10:
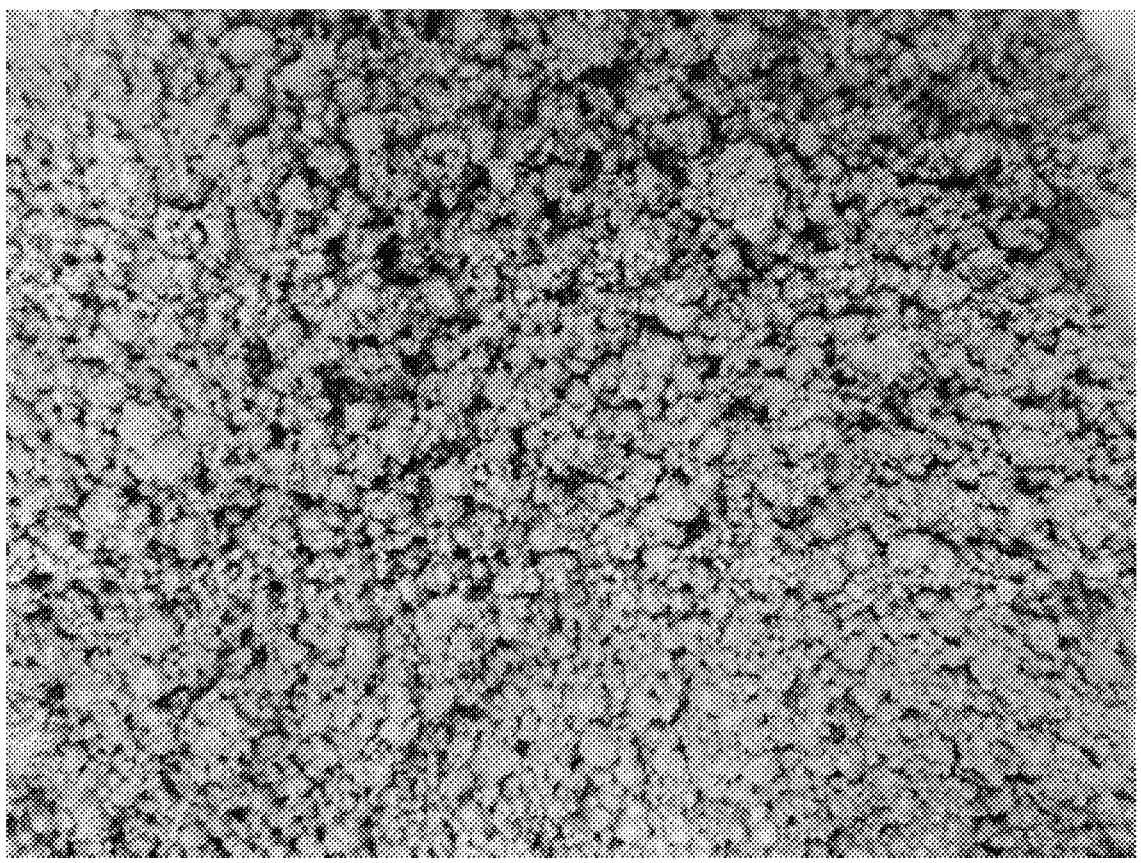
FIG. 10 shows the result of Experimental Example 2-1 and is a photograph of a geopolymer prepared using a coal bottom ash and an alkali activating agent mixed at a liquid/solid ratio of 0.41.
Figure 11:
FIG. 11 shows the result of Experimental Example 2-1 and is a photograph of a geopolymer prepared using a coal bottom ash and an alkali activating agent mixed at a liquid/solid ratio of 0.43.

FIG. 9 shows the result of a compressive strength experiment, in which the highest compressive strength was 68.4 MPa at a liquid/solid ratio of 0.40. The compressive strength increased linearly when the liquid/solid ratio was increased from 0.36 to 0.40, and decreased linearly after the liquid/solid ratio became 0.40. When the liquid/solid ratio was 0.41, a mixture started to form a gel in a pellet form (see the photograph of the geopolymer of FIG. 10), and was completely gelled at a ratio of 0.43. After gelling was completed, cracks were generated in a microwave radiation process, thus exhibiting low compressive strength (see the photograph of the geopolymer of FIG. 11).

Experimental Example 2-2: Thermal Conductivity

Figure 12:
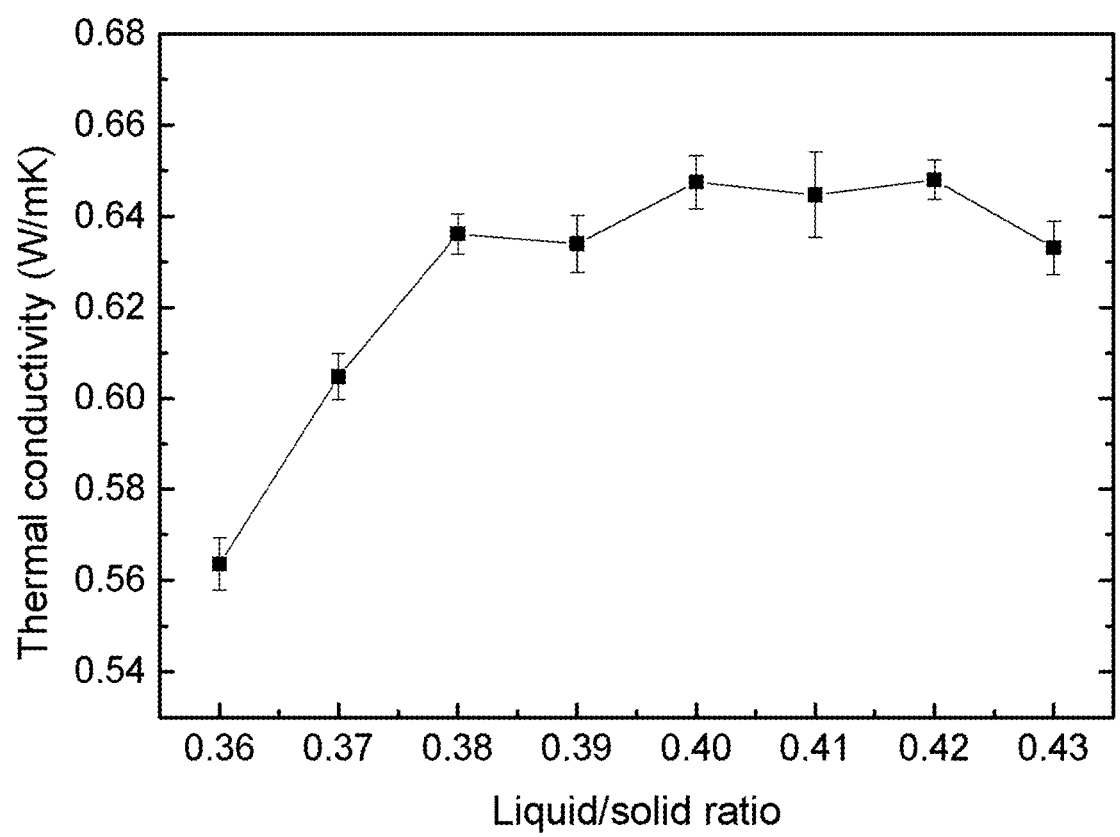
FIG. 12 shows the result of Experimental Example 2-2 and is a graph showing the result of an experiment to measure liquid/solid ratio vs. thermal conductivity.

FIG. 12 is a graph showing the result of the measurement of liquid/solid ratio vs. thermal conductivity. The thermal conductivity of the geopolymer increased until the liquid/solid ratio reached 0.38 but not much after that. This seems to be due to the fact that as the liquid/solid ratio is increased, the mixture is gradually pelletized to thus allow voids to be contained in the geopolymer.

Experimental Example 3: Experiment According to Output and Time of Microwave

In Experimental Example 3, the weight ratio of a bottom ash to an alkali activating agent was fixed to 1:0.4, and the compressive strength and the thermal conductivity were then measured using microwave output and time as variables. The initial bulk density of a geopolymer specimen demolded from a mold was 1.98 g/cm$^3$, a curing condition included 24 hours in an oven at 75° C., and a method of mixing with the alkali activating agent and a method of measuring physical properties were the same as those of Experimental Example 1.

Figure 13:
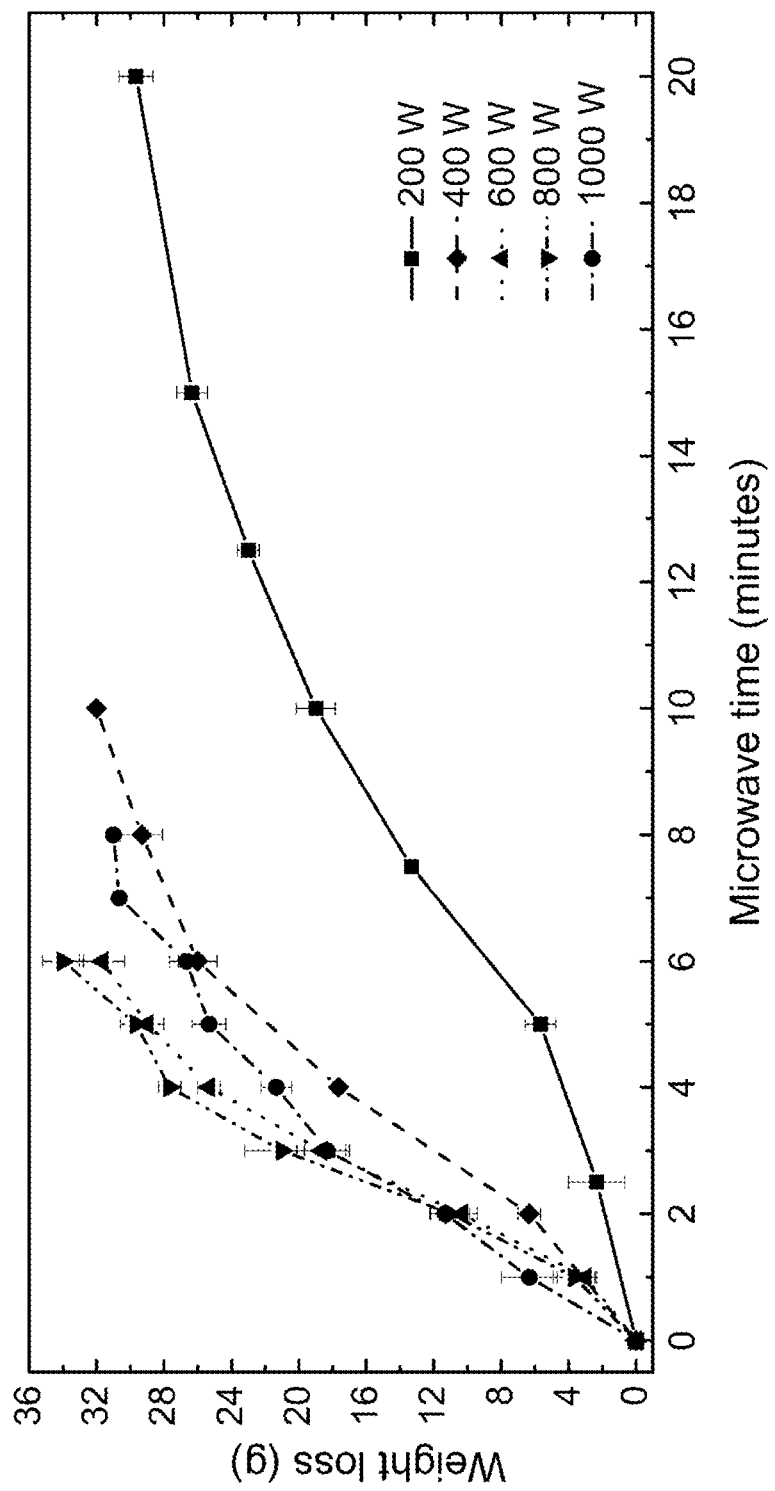
FIG. 13 shows the result of Experimental Example 3-1 and is a graph showing the result of measurement of microwave radiation time vs. mass loss.

Experimental Example 3-1: Weight Loss According to Radiation Time and Output of Microwave The experiment was performed for microwave outputs ranging from 200 W to 1000 W divided at intervals of 200 W, and the mass loss depending on the microwave radiation time (minutes) is as shown in FIG. 13.

Experimental Example 3-2: Compressive Strength

Figure 14:
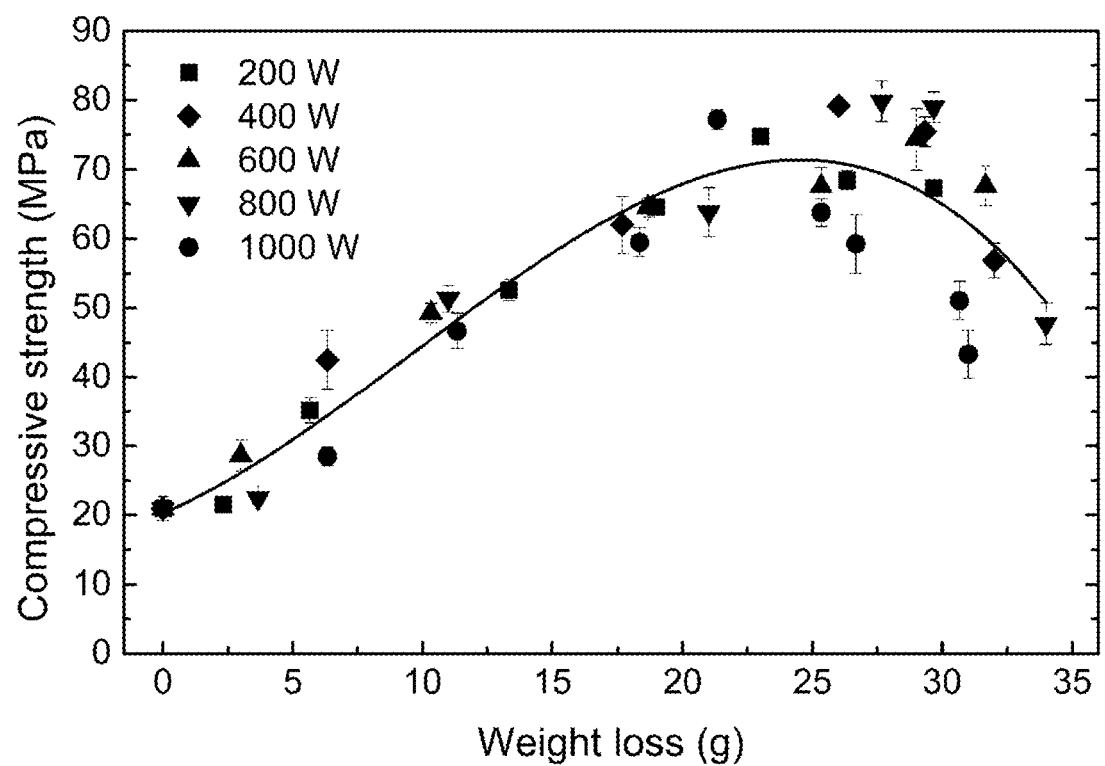
FIG. 14 shows the result of Experimental Example 3-2 and is a graph showing the result of measurement of mass loss vs. compressive strength.

FIG. 14 shows the result of the experiment of mass loss vs. compressive strength for each microwave output, which exhibited similar patterns at microwave outputs of 400, 600, and 800 W. High compressive strength was exhibited for small mass loss was when the microwave outputs were 200 W and 1000 W, compared to the other outputs. However, the mass loss and the compressive strength were generally similar for all microwave outputs, and it could be concluded that the compressive strength was closely correlated with mass loss. FIG. 14 shows the results of experiments on geopolymer samples having a size of 5×5×5 cm, and it could be seen that the compressive strength is very high when mass loss of about 25 g occurs regardless of the microwave output.

Experimental Example 3-3: Thermal Conductivity

Figure 15:
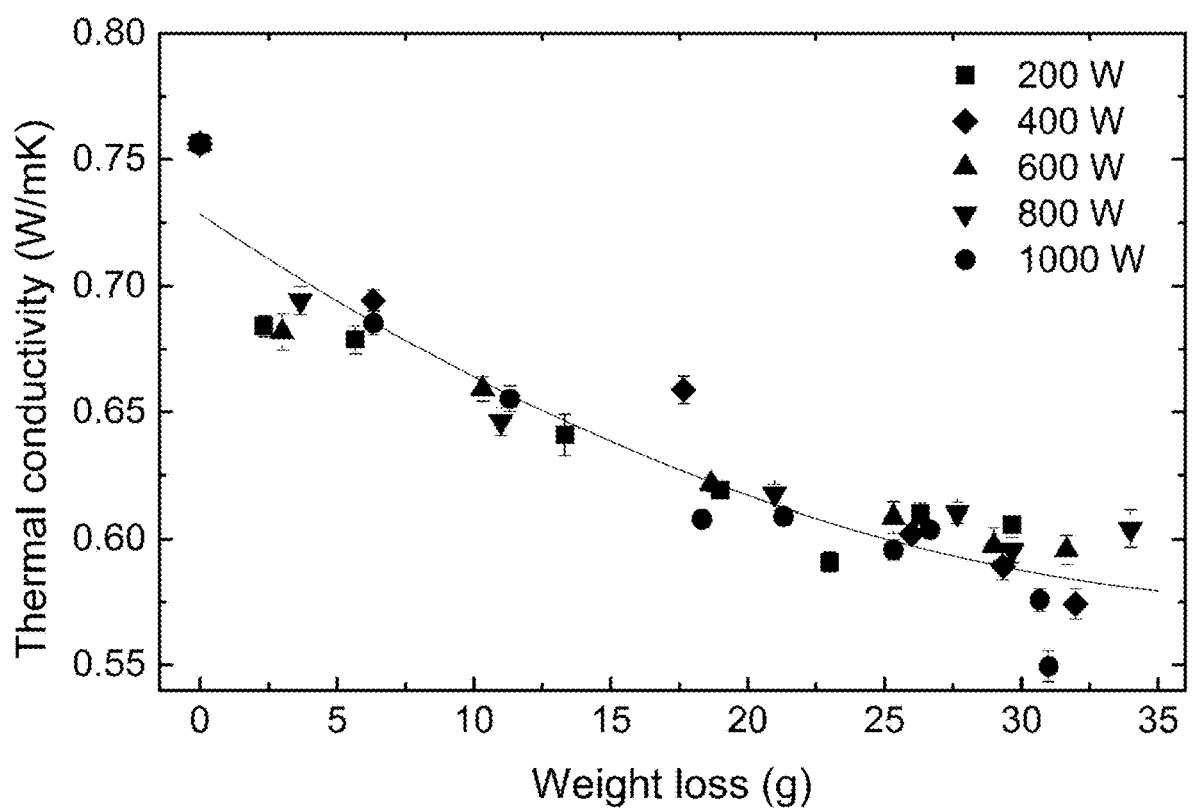
FIG. 15 shows the result of Experimental Example 3-3 and is a graph showing the result of the measurement of mass loss vs. thermal conductivity.

FIG. 15 is a graph showing the result of the measurement of mass loss vs. thermal conductivity. The result of the thermal conductivity showed a close correlation with mass loss. In the case of thermal conductivity, the thermal conductivity was continuously reduced depending on mass loss to a predetermined level (about 0.6 W/mK).

What is claimed is:
1. A method of preparing a geopolymer using a coal bottom ash, the method comprising:
   a step (1) of preparing a mixture of the coal bottom ash and an alkali activating agent by performing mixing while an amount of the alkali activating agent is adjusted so that the mixture does not become a gel, wherein the mixture does not contain a gel;
   a step (2) of filling a mold with the mixture of the coal bottom ash and the alkali activating agent and applying a pressure thereto to thus prepare a geopolymer specimen;
   after the step (2), a step (3) of demolding the geopolymer specimen from the mold, and then curing only the geopolymer specimen in an oven for a predetermined period of time after the geopolymer specimen is demolded from the mold; and
   a step (4) of radiating a microwave on the geopolymer specimen after the curing, wherein an output or a radiation time of the microwave is adjusted to thus control a compressive strength and a thermal conductivity of the geopolymer in the step (4),
   wherein a content of the alkali activating agent is 0.40 based on 1 part by weight of the coal bottom ash in the step (1).
2. The method of claim 1, wherein the alkali activating agent is any one selected from the group consisting of NaOH, KOH, K$_2$SiO$_3$, and Na$_2$SiO$_3$ in the step (1).
3. The method of claim 1, wherein the pressure is adjusted during compression molding in the mold to thus control the compressive strength and the thermal conductivity of the geopolymer in the step (2).
4. The method of claim 1, wherein a temperature of the oven is 50 to 85° C. in the step (3).
5. The method of claim 1, wherein the geopolymer specimen is cured in the oven including a plastic bag configured to seal the geopolymer specimen and to substantially prevent water evaporation from the geopolymer specimen in the step (3).

* * * * *